(12) United States Patent
Tomita et al.

(10) Patent No.: US 7,642,962 B2
(45) Date of Patent: Jan. 5, 2010

(54) ADAPTIVE ARRAY ANTENNA SYSTEM AND METHOD OF CONTROLLING DIRECTIVITY THEREOF

(75) Inventors: Chikahiro Tomita, Gunma (JP); Fumitaka Iizuka, Gunma (JP); Kenji Kamitani, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 12/116,883

(22) Filed: May 7, 2008

(65) Prior Publication Data

US 2009/0015473 A1 Jan. 15, 2009

(30) Foreign Application Priority Data

| May 11, 2007 | (JP) | ............................. 2007-126764 |
| Apr. 17, 2008 | (JP) | ............................. 2008-107504 |

(51) Int. Cl.
  *H01Q 3/00* (2006.01)
  *H04B 7/00* (2006.01)
(52) U.S. Cl. ...................................... 342/372; 342/367
(58) Field of Classification Search ................. 342/367, 342/368, 372, 374; 455/277.1, 277.2
See application file for complete search history.

(56) References Cited

U.S. PATENT DOCUMENTS

2004/0203834 A1* 10/2004 Mahany ...................... 455/453
2006/0182201 A1*  8/2006 Lindenmeier et al. ....... 375/332

FOREIGN PATENT DOCUMENTS

JP     2001 160708 A    6/2001

* cited by examiner

*Primary Examiner*—Dao L Phan
(74) *Attorney, Agent, or Firm*—Law Office of Katsuhiro Arai

(57) ABSTRACT

An adaptive array antenna is disclosed which permits the circuit scale to be reduced by omitting a down-converter, an AD converter, and interconnects for them while controlling the directivity well. In one aspect, the array antenna comprises phase shift-amplitude control modules which accept signals received by antenna elements via an analog-to-digital converter. The value of any one of phase-amplitude change modules is set to 1. The values of the other phase-amplitude change modules are set to 0. Thus, the signal from any one antenna element is accepted. This sequence of operations is repeated as many times as there are antenna elements, whereby signals received by all the antenna elements can be accepted.

6 Claims, 12 Drawing Sheets

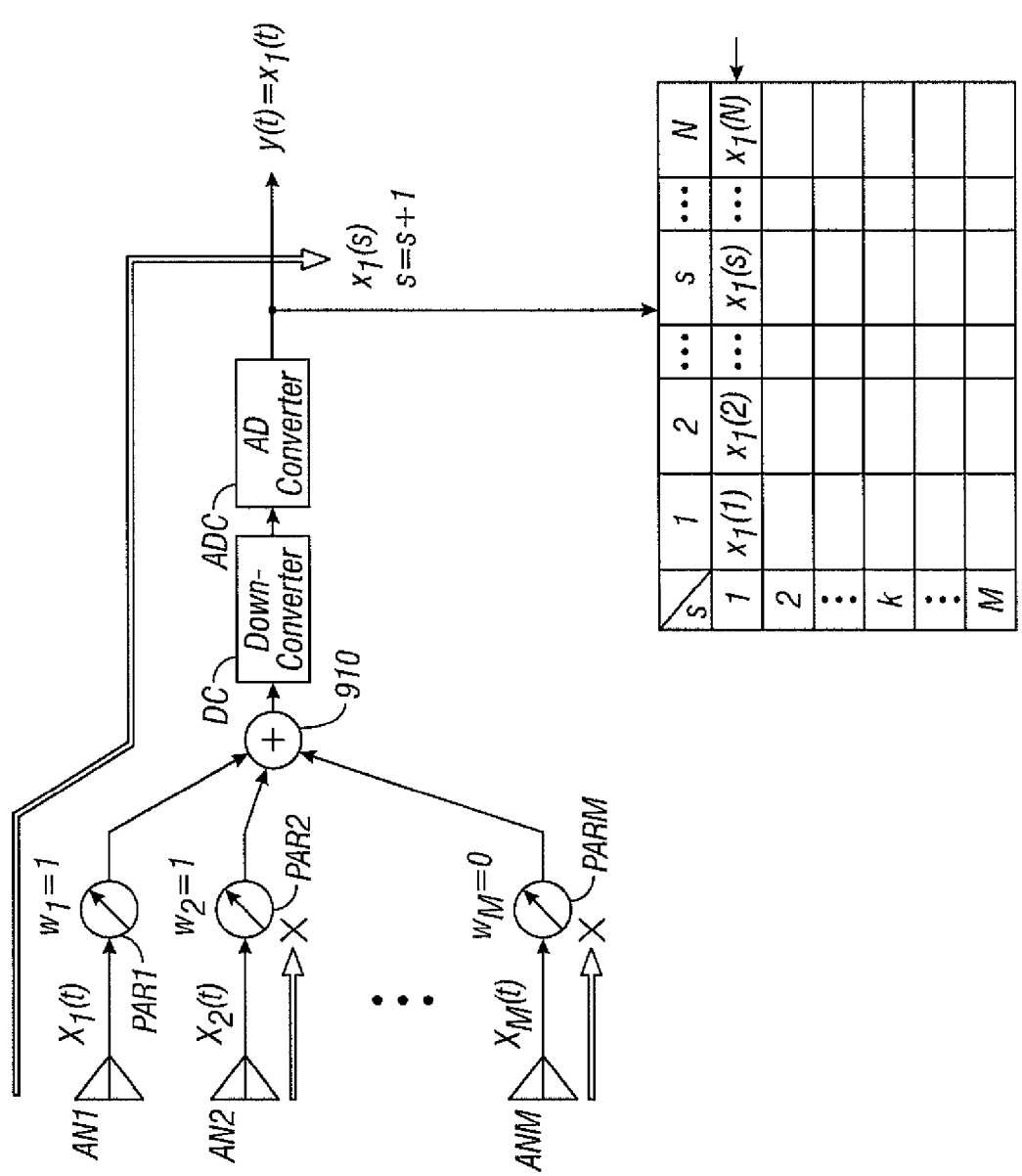

ADAPTIVE ARRAY ANTENNA SYSTEM AND METHOD OF CONTROLLING DIRECTIVITY THEREOF

BACKGROUND OF THE INVENTION

1. Field of the Invention

The present invention relates to an adaptive array antenna system and to a method of controlling the directivity of the antenna system and, more particularly, to an adaptive array antenna system of simplified construction and to a method of controlling the directivity of this antenna system.

2. Description of the Related Art

With respect to an adaptive array antenna including an array of antenna elements, the directivity can be modified dynamically according to variations in electromagnetic circumstances. Such adaptive array antennas are employed in base stations for cellular phones.

The fundamental structure of an adaptive array antenna having analog phase-amplitude change modules (load) is shown in FIG. 7. In this figure, the frequencies of signals received by antenna elements AN1, AN2, . . . , ANM are lowered to given values by downconverters DC1, DC2, . . . , DCM, respectively. Furthermore, the analog signals are converted into digital signals by AD converters ADC1, ADC2, . . . , ADCM, respectively, and supplied to a phase shift-amplitude calculation module 902 of a phase shift-amplitude control module 900. For example, the phase-shift amplitude control module 900 may be made of a digital signal processor (DSP). The phase-shift amplitude calculation module 902 performs given computation while referring to a reference signal outputted from a reference signal output module 904. The results of the computation are supplied to phase-amplitude change module PAR1, PAR2, . . . , PARM via phase-amplitude determination module PAD1, PAD2, . . . , PADM, respectively. In the phase-amplitude change module PAR1, PAR2, . . . , PARM, the phases and amplitudes of the signals received by the antenna elements AN1, AN2, . . . , ANM are varied. The modified signals are added up by a combiner 910. The sum signal from the combiner 910 is converted into a signal of a given frequency by a downconverter DC, converted into a digital signal by an AD converter ADC, and supplied to a demodulator 912.

FIG. 8 shows an example of digitized version of DBF (digital beam-forming) of a phase shift-amplitude control module 950. This beam-forming module accepts signals from antenna elements directly and obtains desired directivity by digital signal processing. As shown in FIG. 8, the phase shift-amplitude control module 950 includes phase-amplitude determination module QAD1, QAD2, . . . , QADM, phase-amplitude change module QAR1, QAR2, . . . , QARM, and a combiner 952 which have been all digitized, together with the phase shift-amplitude calculation module 902 and reference signal output module 904. The sum output from the combiner 952 is supplied to a demodulator 912.

As described so far, in the adaptive array antenna, signals received from the antenna elements are entered to the phase shift-amplitude control module, in order to control the phases and amplitudes of electromagnetic waves received by the antenna elements. However, to permit the signals to be entered to the phase shift-amplitude control module from the antenna elements, the same numbers of downconverters and AD converters as the antenna elements are required. This increases the circuit scale.

A known technique for reducing the circuit scale by omitting such downconverters and AD converters is an "adaptive array antenna" described in JP-A-2001-160708 described below. This controls the amount of phase shift based on a partial differential coefficient relative to the amount of phase shift of an evaluation function by resetting the amount of phase shift of one of plural phase shifting modules to a value obtained by increasing the presently set amount of phase shift by a given angle of 90°, then resetting the presently set amount of phase shift to a value obtained by reducing the presently set amount of phase shift by the given angle, detecting variations in intensity of the combined reception signal by a signal intensity detection module, and finding the partial differential coefficient relative to the amount of phase shift of the evaluation function using only the variations in intensity of the detected reception signal.

According to the technique of JP-A-2001-160708, the found partial differential value of phase is optimized, for example, based on a method of steepest descent. This eliminates downconverters and AD converters which would have been heretofore mounted on individual antenna elements. Furthermore, interconnect lines for them are not present. Consequently, the circuit can be simplified and made smaller in size.

However, in the known technique as described above, input signals from the individual antenna elements are not directly obtained. Rather, phase control is provided by finding a partial differential coefficient regarding the amount of phase shift without using the input signals. Therefore, the presently adopted algorithm that is used to perform calculations using the input signals cannot be used intact. In particular, it is difficult to utilize a method other than the gradient method as a method of optimizing antenna characteristics. That is, there is the inconvenience that it is impossible to perform complex manipulations such as selecting an optimization method according to the electromagnetic circumstances or it is difficult to adopt a novel algorithm for the array antenna.

SUMMARY OF CERTAIN INVENTIVE ASPECTS

Certain inventive aspects provide an adaptive array antenna system which permits the directivity to be controlled well, enables the circuit scale to be reduced by omitting downconverters, AD converters, and interconnects for them, and allows adoption of various kinds of methods of optimizing characteristics. Certain inventive aspects provide a directivity control method adapted for the adaptive array antenna system.

One embodiment of the present invention provides a method of controlling the directivity of an adaptive array antenna which, when signals received by plural antenna elements are summed up, modifies the directivity dynamically by modifying the phase and amplitude of the signal from each antenna element by phase-amplitude change modules. Whenever a different preamble cycle of the received signal comes, the phase-amplitude change modules are sequentially made to perform a switching operation. During the switching operation, the output signals from the phase-amplitude change modules are accepted in turn. The signals received from all the antenna elements are recorded utilizing plural ones of the preamble cycles. Then, calculations are performed to control the directivity dynamically, utilizing the recorded signals. Thus, one of the above-described objects is achieved. Another embodiment of the invention provides an adaptive array antenna system using this method of controlling the directivity. The foregoing and other objects, features, and advantages of certain inventive aspects will become apparent from the following detailed description and accompanying drawings.

According to certain inventive aspects, the signal received by one antenna element is accepted during one preamble cycle of received signal. Signals received from all the antenna elements are accepted utilizing plural preamble cycles. Therefore, calculations for dynamically controlling the directivity can be performed without providing a downconverter and an AD converter for each individual antenna element. In consequence, the circuit scale can be reduced. Furthermore, because received signals are accepted, various optimization methods can be applied according to circumstances or applications.

BRIEF DESCRIPTION OF THE DRAWINGS

FIGS. 4A, 4B and 4C are diagrams illustrating the manner in which a signal is accepted from an antenna element AN1 in the Embodiment 1;

DETAILED DESCRIPTION OF CERTAIN INVENTIVE EMBODIMENTS

Certain embodiments of the present invention is hereinafter described in detail.

Embodiment 1

Figure 1:
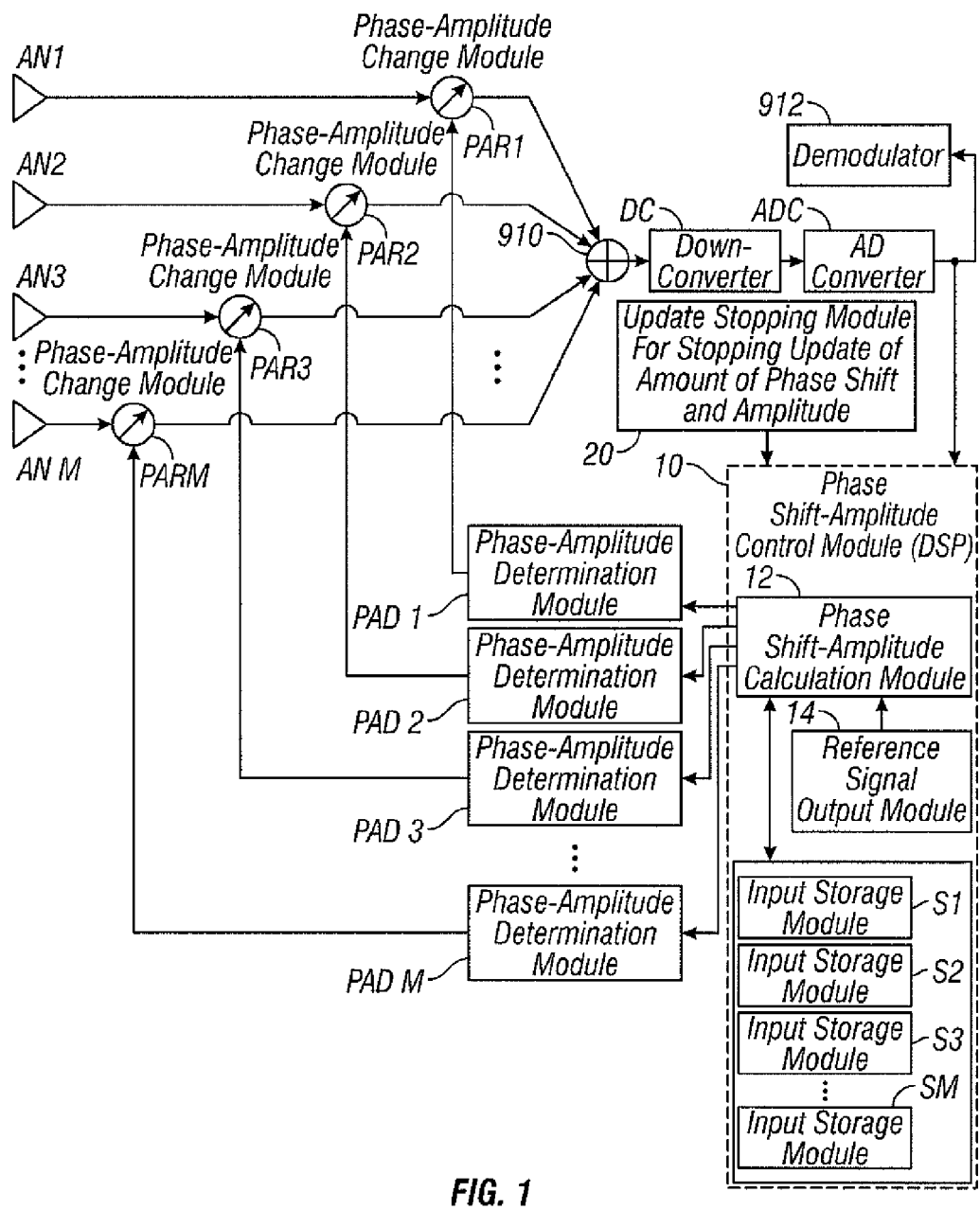
FIG. 1 is a block diagram showing the circuit configuration according to Embodiment 1 of the present invention.

FIG. 1 is a circuit block diagram of the present embodiment. The output terminals of antenna elements AN1, AN2, ..., ANM at which received signals appear are connected with the input terminal of a combiner 910 via phase-amplitude change modules PAR1, PAR2, ..., PARM, respectively. The output terminal of the combiner 910 at which a sum output signal is produced is connected with the input terminal of a demodulator 912 via both a downconverter DC and an AD converter ADC. The configuration described so far is the same as the known configuration described already in connection with FIG. 7.

In the present embodiment, the output terminal of the AD converter ADC is connected with the input terminal of a phase shift-amplitude control module 10. For example, the control module 10 is made of a DSP (digital signal processor), and includes a phase shift-amplitude calculation module 12, a reference signal output module 14, and input storage module S1, S2, ..., SM. The output terminal of an update-stopping module 20 for stopping update of amount of phase shift and amplitude is also connected with the phase shift-amplitude control module 10.

Of these modules, the phase shift-amplitude calculation module 12 includes a CPU as its main component. An arithmetic program for calculating an amount of phase shift and amplitude is loaded in a program memory (not shown) and executed. The reference signal output module 14 outputs an ideal reply signal and is a kind of memory. Input storage module S1, S2, ..., SM are memories for storing data carried by signals entered from the AD converter ADC.

The output terminal of the phase shift-amplitude calculation module 12 at which the results of calculations are produced is connected with the input terminals of phase-amplitude determination module PAD1, PAD2, ..., PADM. The output terminals of the phase-amplitude determination module PAD1, PAD2, ..., PADM are connected with the control input terminals of the phase-amplitude change module PAR1, PAR2, ..., PARM, respectively.

Figures 2A, 2B, 2C:
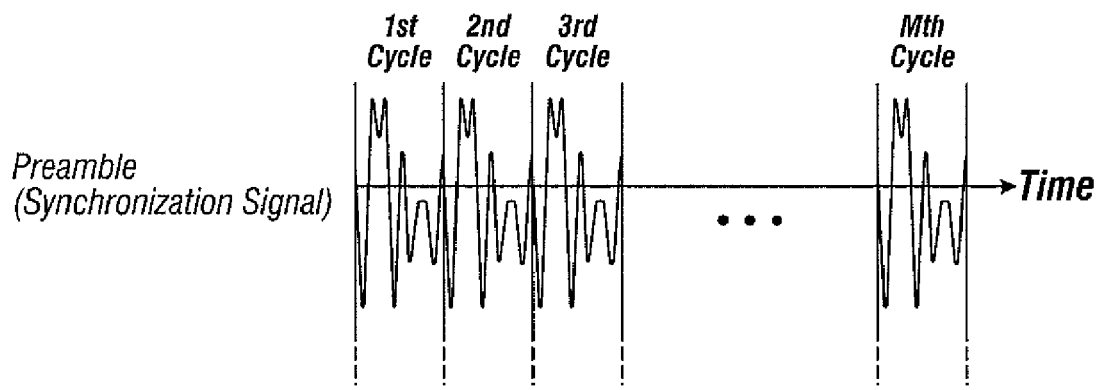
FIGS. 2A, 2B and 2C are diagrams illustrating the fundamental operation of the Embodiment 1.

The operation of the present embodiment is next described summarily by referring to FIGS. 2A, 2B and 2C. In order to control the amount of phase shift and the amplitude, it is necessary to obtain signals received by the antenna elements AN1, AN2, ..., ANM. In the present embodiment, the signals received by the antenna elements are accepted by the phase shift-amplitude control module 10 via the AD converter ADC. However, what is obtained from the AD converter ADC is only the sum value of all the signals received by the antenna elements. Accordingly, the value of any one of the phase-amplitude change module PAR1, PAR2, ..., PARM is varied to "1" or "0". Thus, the input signal from any one antenna element is switched. In this way, the signal received by any one antenna element is accepted.

FIGS. 2A to 2C show the manner in which the signal is accepted. For example, in the first preamble cycle (FIG. 2A) (synchronization signal) of a signal received by an antenna element, the phase-amplitude change module PAR1 assumes a value of 1, while the other phase-amplitude change module PAR2, PAR3, ..., PARM assume a value of 0 (see FIG. 2B). In other words, the phase-amplitude change module PAR1 is turned on and provides a signal output, while the other phase-amplitude change module PAR2, PAR3, ..., PARM are turned off or are otherwise configured to block the signal output. Therefore, only the signal received by the antenna element AN1 is applied to the combiner 910 and then accepted into the phase shift-amplitude control module 10 via the downconverter DC and AD converter ADC (see FIG. 2C).

Similarly, in the second preamble cycle (see FIG. 2A), the phase-amplitude change module PAR2 assumes a value of 1, while the other phase-amplitude change module PAR1, PAR3, ..., PARM assume a value of 0 (FIG. 2B). In other words, the phase-amplitude change module PAR2 is turned on and provides a signal output. The other phase-amplitude change module PAR1, PAR3, ..., PARM do not. Therefore, only the signal received by the antenna element AN2 is applied to the combiner 910 and then accepted into the phase shift-amplitude control module 10 via the downconverter DC and the AD converter ADC (see FIG. 2C). These operations are performed successively and repetitively up to the Mth preamble cycle. The signals from all the antenna elements AN1, AN2, ..., ANM are accepted at intervals of M cycles.

The sequence of operations described so far is next described in further detail by referring also to FIGS. 3A, 3B, 4A to 4C, 5A to 5C and 6A to 6C. The procedure of operations performed by the phase shift-amplitude control module 10 is shown as a flowchart in FIG. 3A. First, a first antenna element taking out a reception signal is specified (step S10). k is an index indicating an antenna element from which a reception signal should be taken out. The antenna element AN1 is specified by setting the index k to 1 (k=1).

The phase shift-amplitude control module 10 determines the values w of the phase-amplitude change module PAR1, PAR2, ..., PARM (step S12). The procedure of the determination is illustrated in FIG. 3B. An initialization operation includes setting the values $w_i$ of the phase-amplitude change module to 0. The initialization operation is performed repetitively until i starting at 1 reaches M (i=1 to M) (steps S120 to S126). i is an index for initializing the values $w_i$ of the phase-amplitude change module PAR1, PAR2, ..., PARM. Then, the value $w_k$ of the kth phase-amplitude change module is set to 1 (step S128). Accordingly, at first, the value $w_1$ of the phase-amplitude change module PAR1 is "1", while the values $w_2$, $w_3$, ..., $w_M$ of the other phase-amplitude change module PAR2, PAR3, ..., PARM are "0", as illustrated at the first cycle of FIG. 2B. In particular, the phase shift-amplitude calculation module 12 calculates the values $w_i$. The phase-amplitude change module PAR1, PAR2, ..., PARM are set to the values $w_i$ via the phase-amplitude determination module PAD1, PAD2, ..., PADM, respectively.

The output y(t) from the antenna array at instant t, i.e., the output from the combiner 910, is the sum of the products of signals $x_i(t)$ received at each antenna element and the values $w_i^*$ (where * indicates complex conjugation) of each phase-amplitude change module. As mentioned previously, however, the value $w_1$ of the phase-amplitude change module PAR1 is 1, whereas the values $w_2$, $w_3$, ... of the other phase-amplitude change module PAR2, PAR3, ... are 0. Consequently, the output from the antenna array is coincident with the input signal $x_1(t)$ at the instant t. Because of this operation, only the signal received by the antenna element AN1 is taken out and then accepted into the phase shift-amplitude control module 10 via the combiner 910, downconverter DC, and AD converter ADC.

Referring back to FIG. 3A, the phase shift-amplitude control module 10 samples the reception signal at the first preamble cycle and records the sampled data as data about the reception signal into the input storage module S1. That is, the first sampling point is specified under the condition where the sampling index s is set to "1" (step S14). At this time, the output from the antenna array, i.e., the output y from the combiner, is accepted as data (step S16 and S18). These operations are performed repetitively until the number of the sampling points reaches a maximum value of N (see steps S20 and S22). Because of these operations, the signal received by the antenna element AN1 is sampled at N sampling points at the first cycle of FIGS. 2A to 2C and the signal data is recorded in the input storage module S1.

Figure 4A:
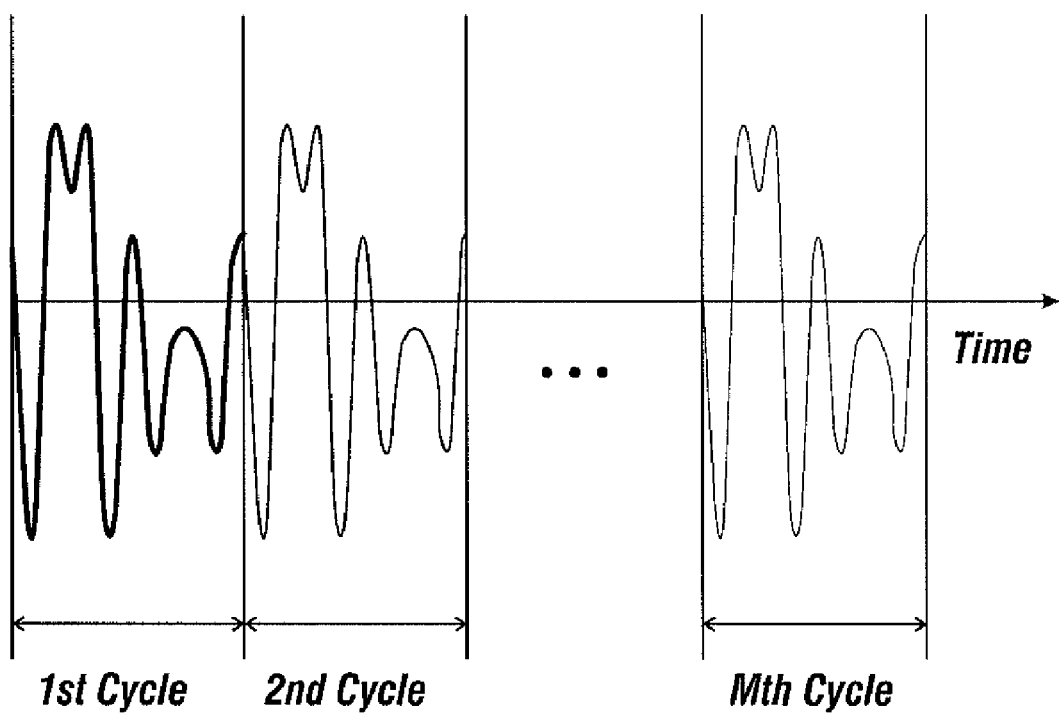

These operations are illustrated in detail in FIGS. 4A to 4C. Electromagnetic waves as shown in FIG. 4A are received by the antenna elements AN1, AN2, ..., ANM. Among these waves, at the first preamble cycle, the value w of the phase-amplitude change module PAR1 is set to "1" as described previously. The values w of the other phase-amplitude change module PAR2, PAR3, ..., PARM are set to "0". Therefore, as indicated by the arrows in FIG. 4B, only the signal received by the antenna element AN1 is entered to the combiner 910 and then processed by the downconverter DC and AD converter ADC. Subsequently, the signal is entered into the phase shift-amplitude control module 10.

In particular, the signal is sampled at sampling points 1 to N at the first preamble cycle of FIG. 4A. Reception signal data $x_1(1), x_1(2), \ldots, x_1(N)$ are obtained at the sampling points and recorded in the input storage module S1. FIG. 4C shows the manner in which the reception signal data at the sampling points 1 to N are recorded into the input storage module S1, S2, ..., SM. Data items $x_1(1), x_1(2), \ldots, x_1(N)$ are recorded as indicated by the arrow in FIG. 4C.

Figure 5A:
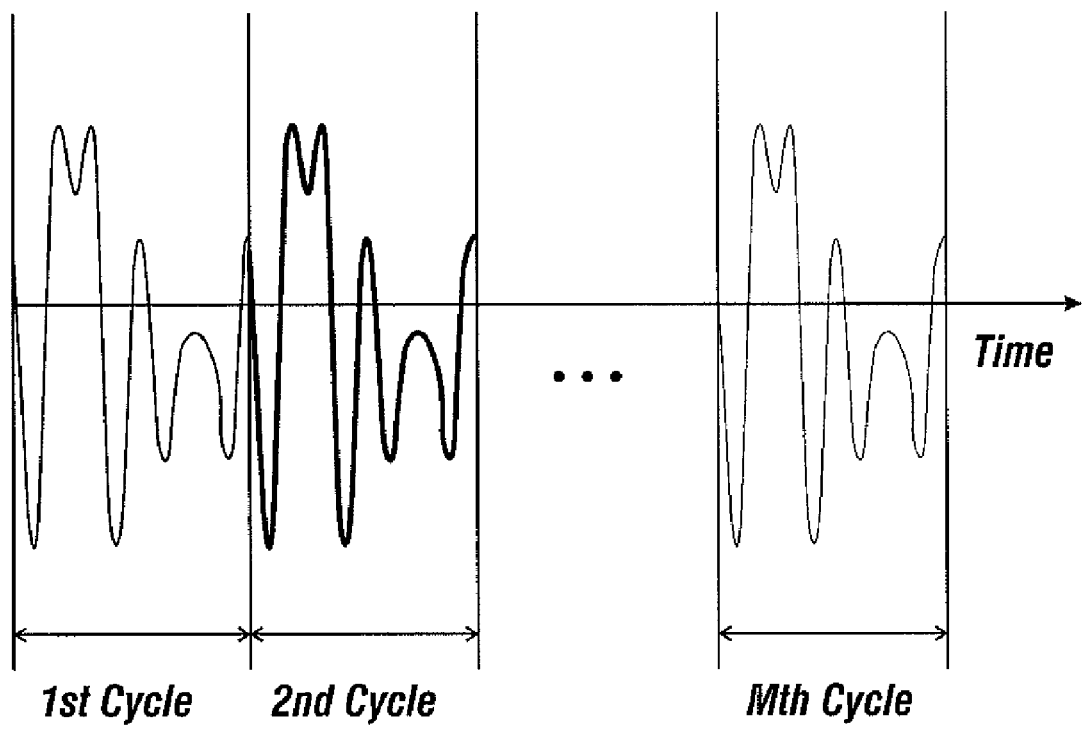
FIGS. 5A, 5B and 5C are diagrams illustrating the manner in which a signal is accepted from an antenna element AN2 in the Embodiment 1.
Figures 5B, 5C:
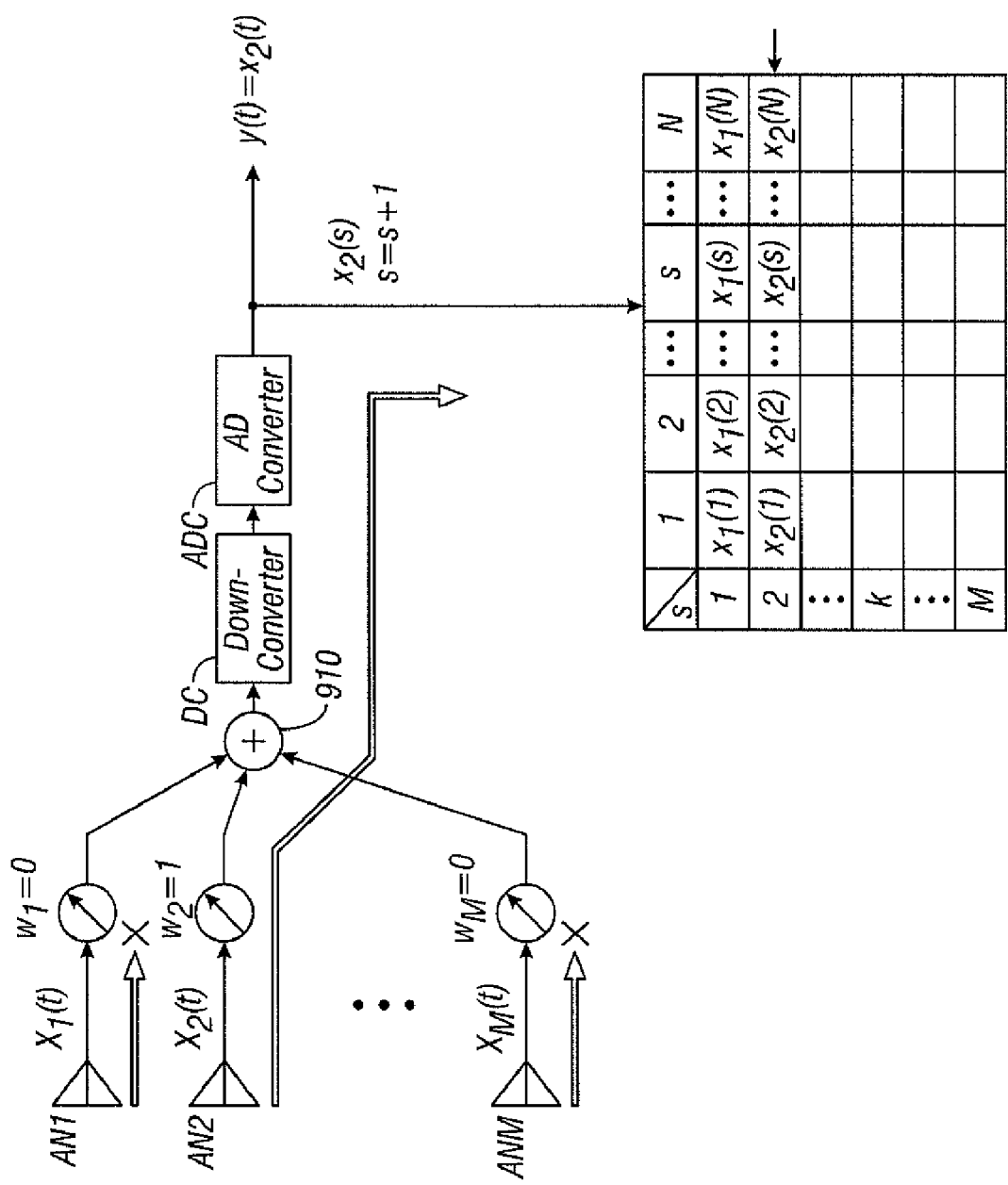

Referring back to FIGS. 3A and 3B, if the sampling of the signal at the preambles received by the antenna element AN1 is completed (Yes at step S20), the same processing is performed regarding the antenna element AN2 (No at step S24; step S26). This is illustrated in FIGS. 5A to 5C. At the second preamble cycle shown in FIG. 5A, the value w of the phase-amplitude change module PAR2 is set to 1. The values w of the other phase-amplitude change module PAR1, PAR3, ..., PARM are set to 0. Therefore, as indicated by arrows in FIG. 5B, only the signal received by the antenna element AN2 is entered into the combiner 910. After processed by the downconverter DC and AD converter ADC, the signal is entered into the phase shift-amplitude control module 10. That is, reception signal data items $x_2(1), x_2(2), \ldots, x_2(N)$ are sampled at the sampling points 1 to N at the second preamble cycle shown in FIG. 5A. These data items are recorded in the input storage module S2 as indicated by the arrow in FIG. 5C.

Figure 6A:
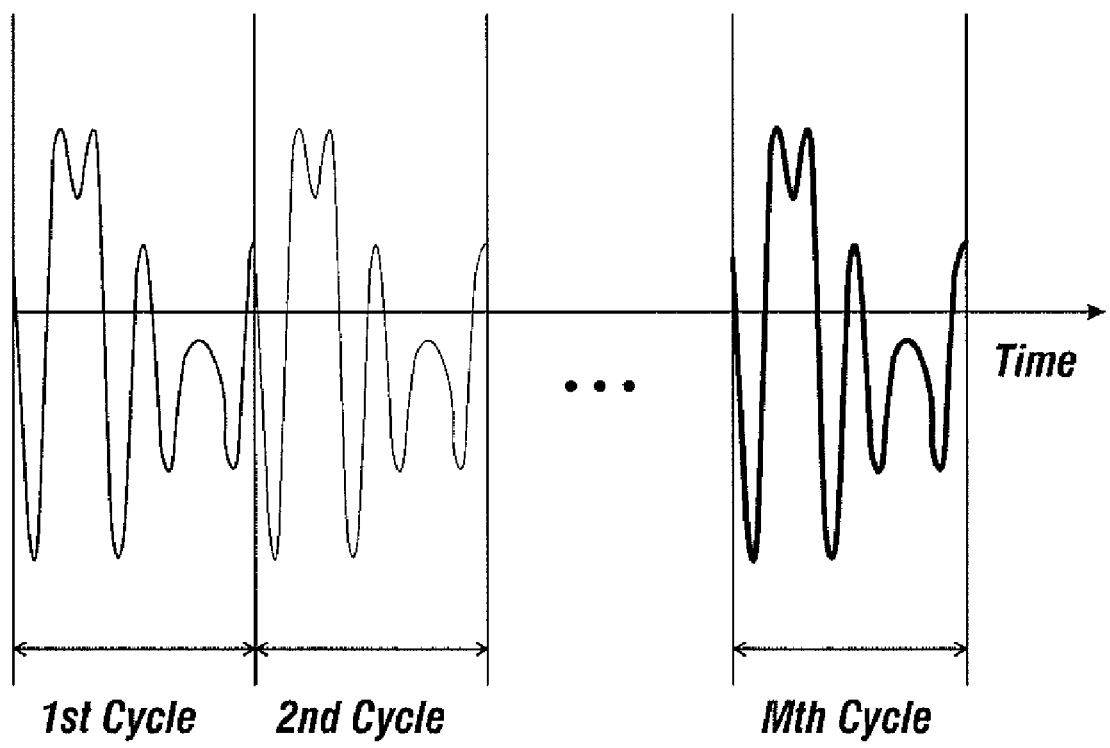
FIGS. 6A, 6B and 6C are diagrams illustrating the manner in which a signal is accepted from an antenna element ANM in the Embodiment 1.
Figures 6B, 6C:
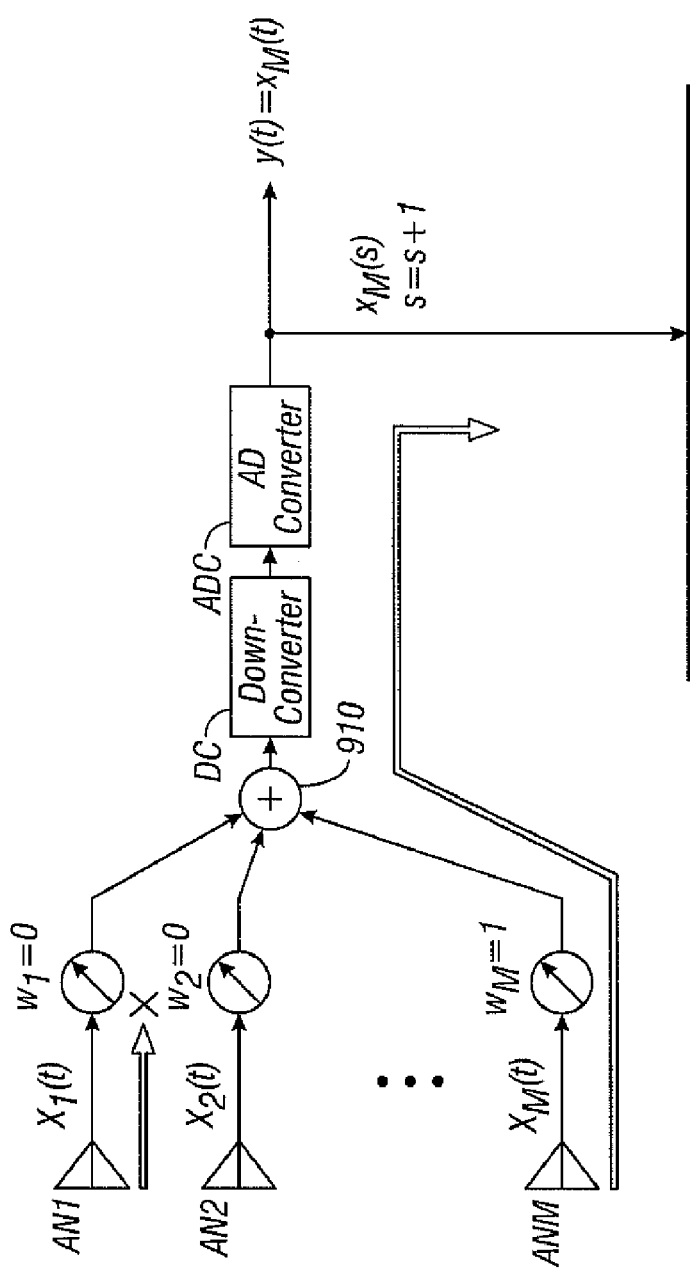

Referring back to FIGS. 3A and 3B, the sequence of operations described so far is performed for the antenna elements AN3, AN4, ..., ANM in succession (Yes at step S24). FIGS. 6A to 6C show the manner in which the signal received by the antenna element ANM is accepted. At the Mth preamble cycle shown in FIG. 6A, the value w of the phase-amplitude change module PARM is set to 1, while the values w of the other phase-amplitude change module PAR1, PAR3, ..., are set to 0. Therefore, as indicated by the arrows in FIG. 6B, only the signal received by the antenna element ANM is entered into the combiner 910 and processed by the downconverter DC and AD converter ADC. Then, the signal is entered into the phase shift-amplitude control module 10. That is, at the Mth preamble cycle of FIG. 6A, reception signal data items $x_M(1), x_M(2), \ldots, x_M(N)$ are sampled at sampling points 1 to N. These data items are recorded in the input storage module SM as indicated by the arrows in FIG. 6C.

When operations regarding all the antenna elements are completed, data items are recorded in the input storage module S1, S2, ..., SM as shown in FIG. 6C. Then, the phase shift-amplitude control module 10 performs calculations by a method of steepest descent or other method, based on data items recorded in the storage module S1, S2, ..., SM in this way and on the reference signal outputted from the reference signal output module 14, by the phase shift-amplitude calculation module 12 (see step S28 of FIG. 3A). As a result, the values of the other phase-amplitude change module PAR1, PAR3, ... for optimizing the antenna characteristics are found. Based on the found values, the values of the phase-amplitude change module PAR1, PAR2, ..., PARM are modified by the phase-amplitude determination module PAD1, PAD2, ..., PADM, thus controlling the directivity. Then, updating of the phase-amplitude change module PAR1, PAR2, ..., PARM is stopped by the update-stopping module 20 for stopping update of amount of phase shift and amplitude.

Figure 7:
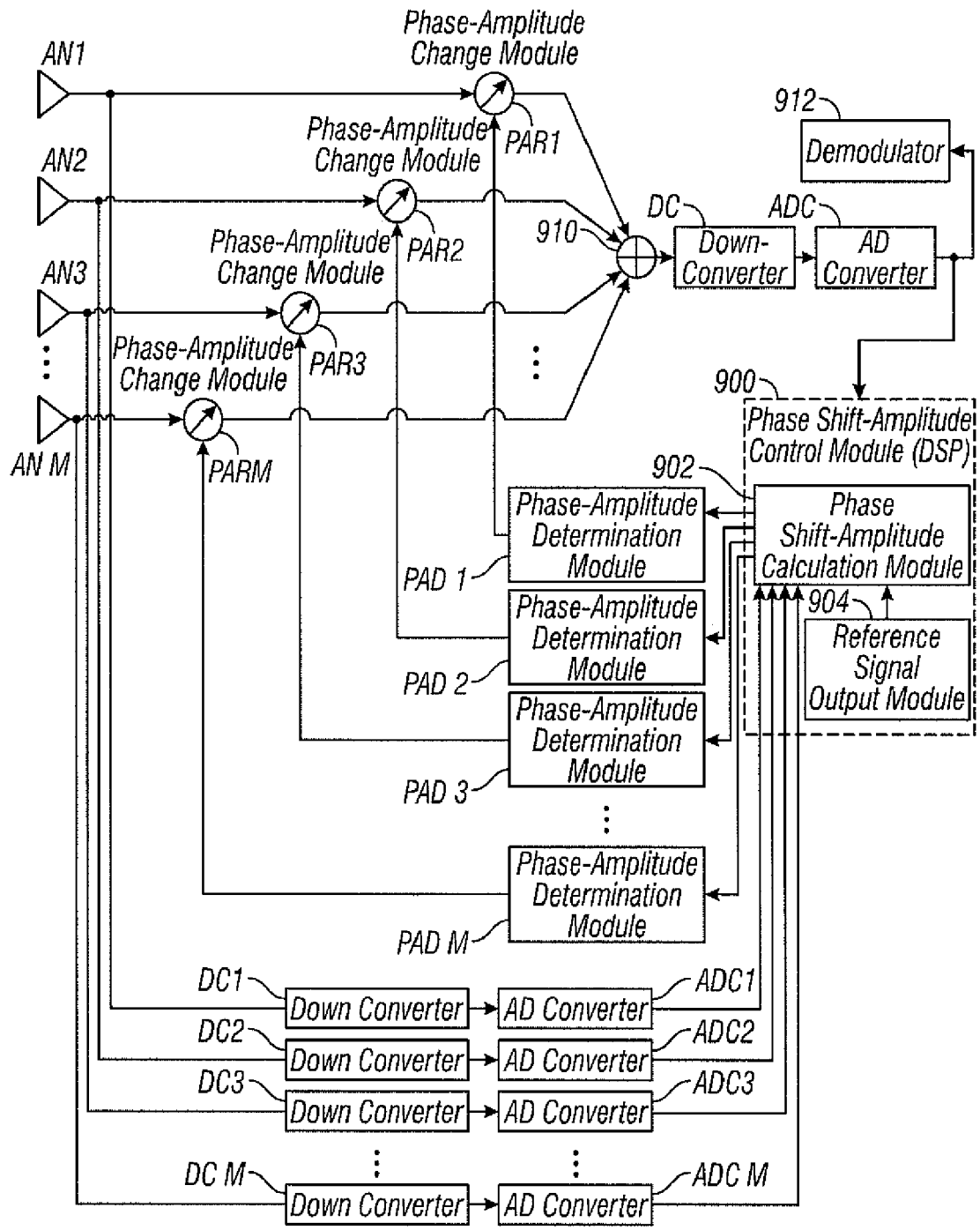
FIG. 7 is a block diagram showing the fundamental structure of an adaptive array antenna whose phase-amplitude change modules are not digitized.
Figure 8:
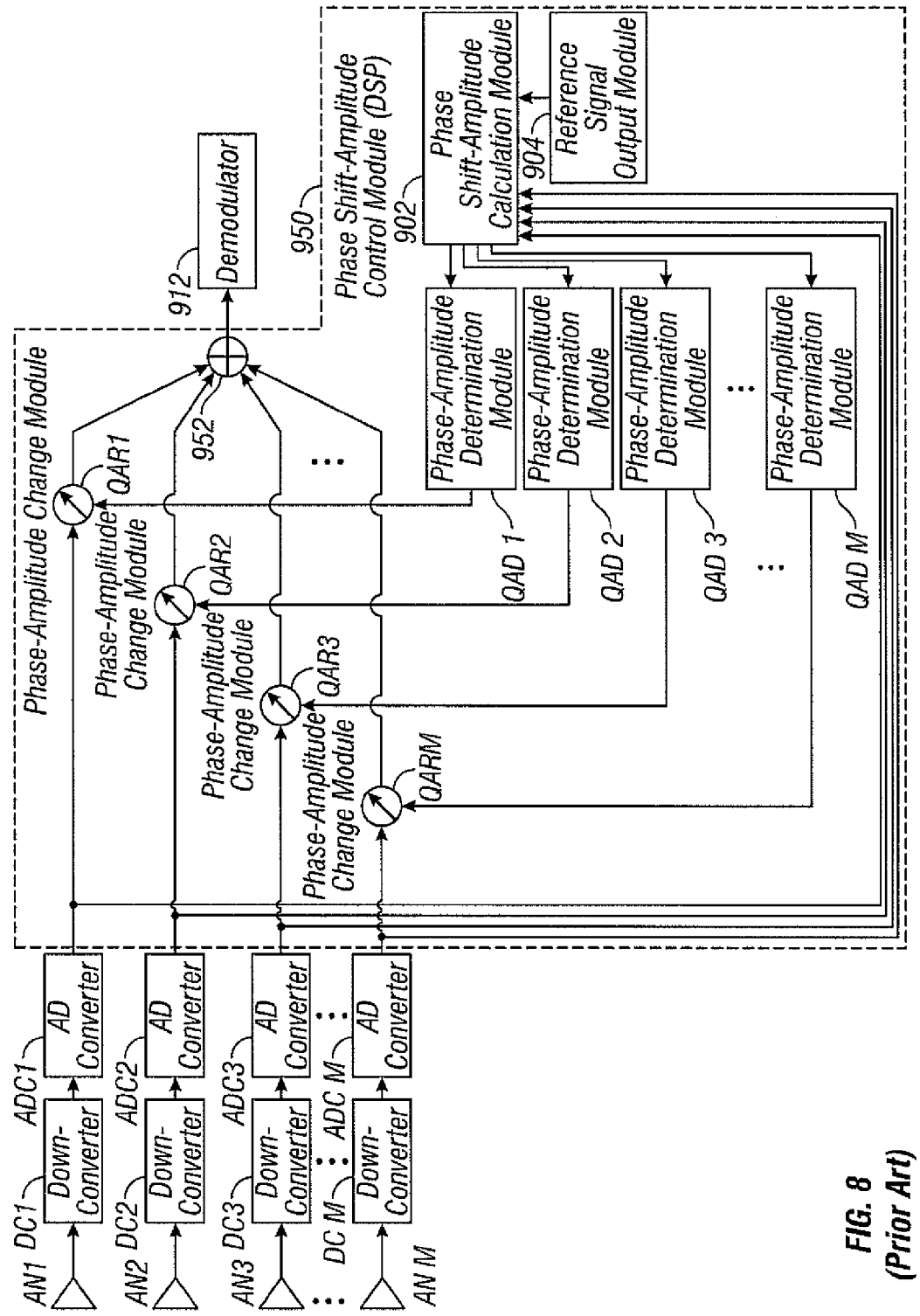
FIG. 8 is a block diagram showing the fundamental structure of DBF (digital beam-forming) module that is another known technique.

This is compared with the known technique of FIG. 7. In the case of this known technique, signals received by all the antenna elements AN1 to ANM are accepted during one cycle of preamble. In contrast, in the present embodiment, the received signals are accepted during M cycles. However, as is obvious by comparison between the circuit configurations of FIGS. 1 and 7, the downconverter DC and AD converter ADC for each individual antenna element are dispensed with. This reduces the circuit scale greatly. Comparison with the known technique of FIG. 8 produces similar results. Furthermore, the present embodiment is different from the technique of the JP-A-2001-160708 in that phase and amplitude information carried by signals received by antenna elements is obtained instead of partial differentiation values of phases. Hence, amplitude information is derived, as well as phase information. For this reason, various optimization methods can be applied according to circumstances and applications, in addition to the method of steepest descent.

It is to be understood that the present invention is not limited to the above-described embodiment and that various modifications and changes are possible without departing from the gist of the invention. For example, the invention includes the following embodiments.

(1) The procedure of operations shown in the above embodiment is merely one example and can be appropriately modified so as to produce the same advantages. For example, when reception signals are accepted, all of the values of the phase-amplitude change module PAR1, PAR2, ..., PARM are initialized at 0 at first. Then, only a desired one is set to 1. Alternatively, a sequence of codes "1, 0, 0, ..., 0" may be applied, and the "1" of the sequence may be cycled through the code positions according to the preamble cycles. For example, where the number of antenna elements M is 4, the position of "1" is cycled through the code positions as follows.

"1,0,0,0"→"0,1,0,0"→"0,0,1,0"→"0,0,0,1"→"1,0,0,0"

(2) The circuit may be made either of an analog circuit or of a digital circuit according to the need. For example, the phase-amplitude determination module and phase-amplitude change module may be digitized as in the known technique shown in FIG. 8.

Figure 3A:
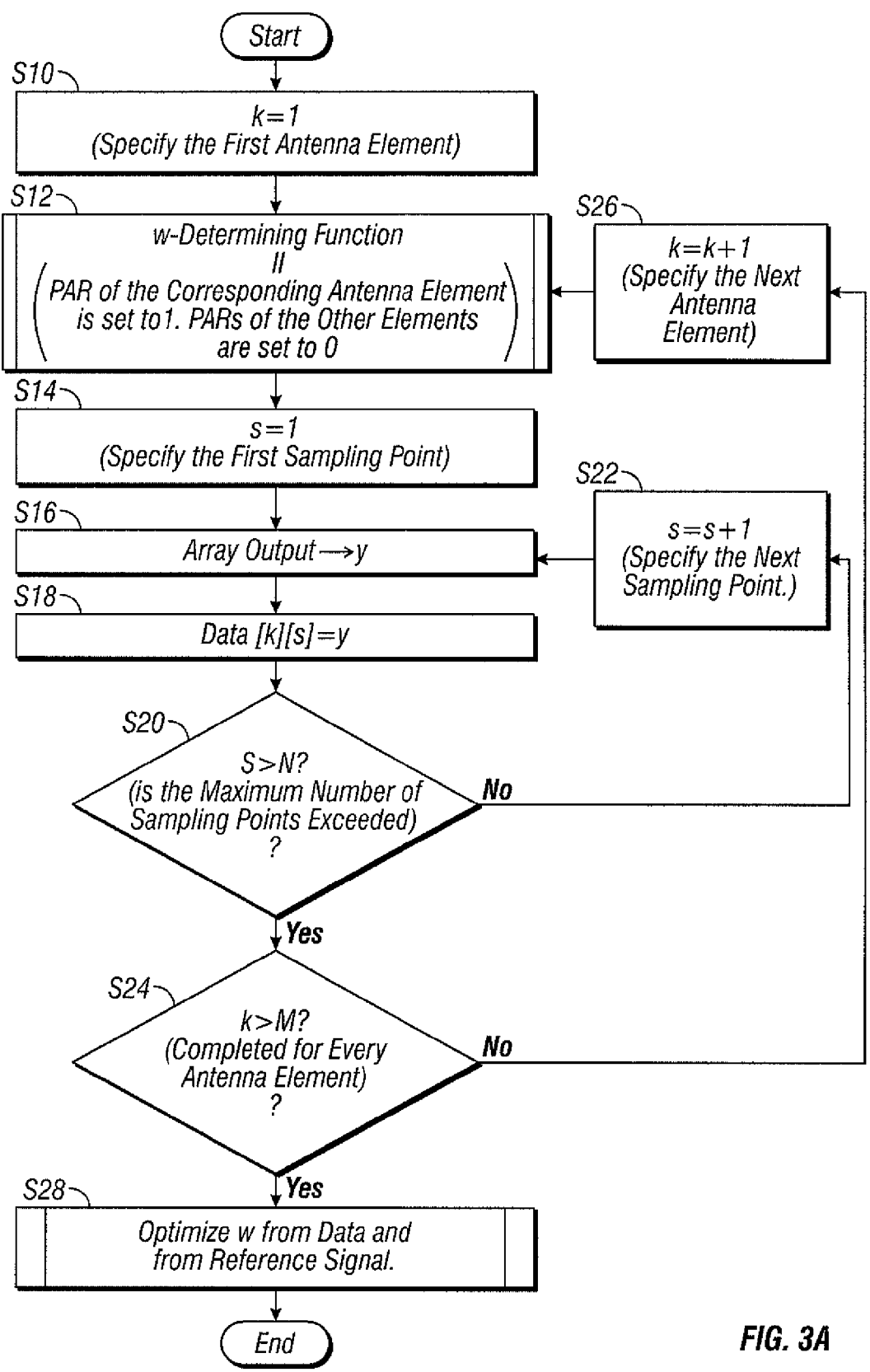
FIGS. 3A and 3B are flowcharts illustrating the operation of a phase shift-amplitude control module of the Embodiment 1.
Figure 3B:
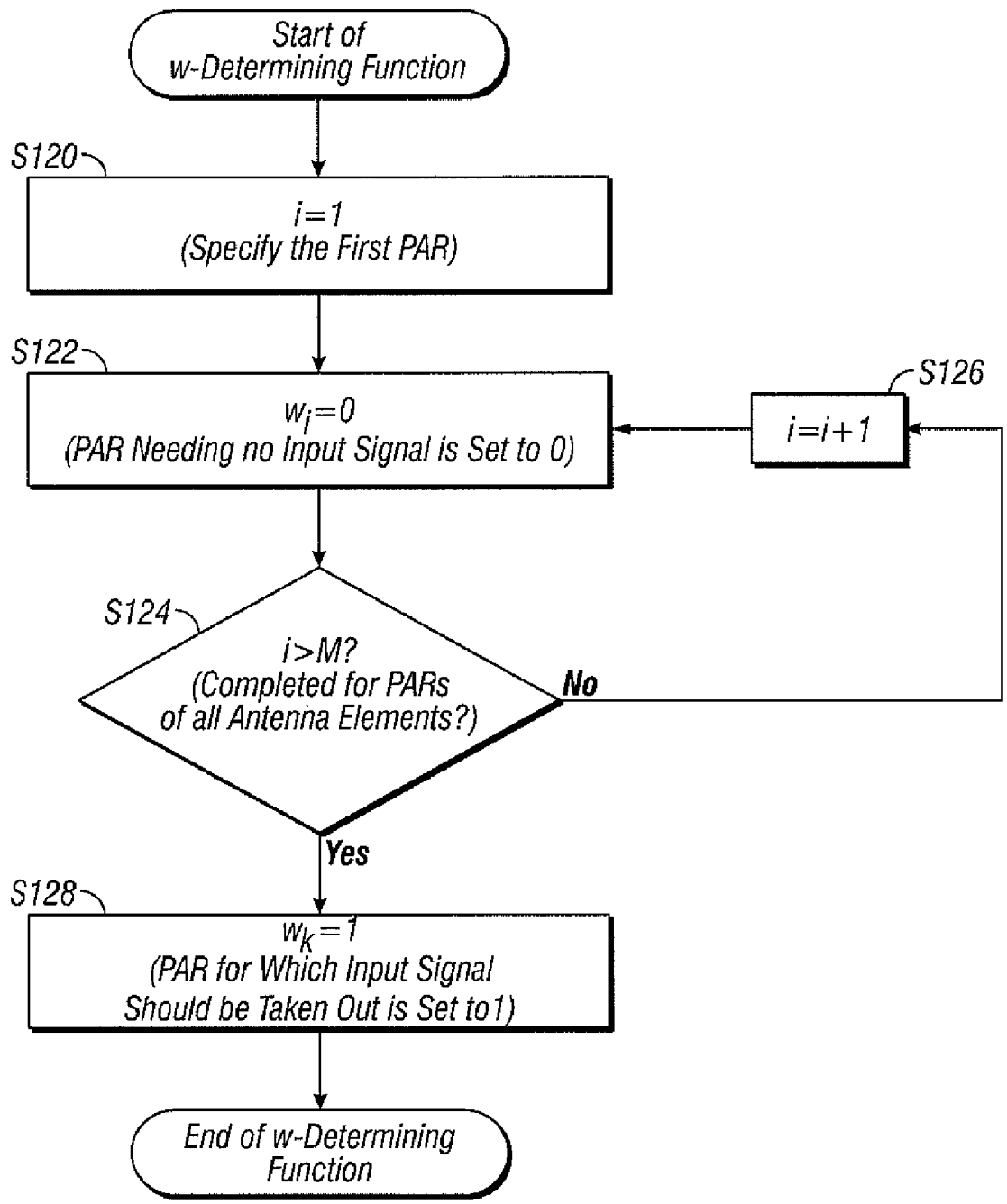

(3) The procedure of operations shown in FIGS. 3A and 3B merely gives one example. The program for the phase shift-amplitude control module 10 may be modified variously to produce similar results.

According to certain embodiments, various optimization methods can be applied while reducing the circuit scale. Therefore, these embodiments can be preferably applied to WLAN access points, base stations for cellular phones or PHS phones, or terrestrial digital broadcast receivers.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of controlling directivity of an adaptive array antenna which comprises a plurality of antenna elements and is designed to control the directivity dynamically by modifying phase and amplitude of a signal in each antenna element by phase-amplitude change modules and combining modified signals from the antenna elements, said phase-amplitude change modules being connected to the respective antenna elements, said method comprising:

determining a signal-accepting sequence of the phase-amplitude change modules wherein only one of the phase-amplitude change modules in each preamble cycle of a received signal is programmed to accept a signal, and all of the phase-amplitude change modules, one-by-one in the sequence, each using a different preamble cycle of a received signal, are programmed to accept signals;

receiving signals by the antenna elements;

accepting the signals by the phase-amplitude change modules one-by-one in the sequence each using a different preamble cycle of a received signal;

accepting output signals from the phase-amplitude change modules by a phase-shift amplitude control module as the output signals are outputted in the sequence from the phase-amplitude change modules and recording the accepted output signals in input storage modules provided for the antenna elements, respectively, wherein the signals received by all the antenna elements are recorded by utilizing different preamble cycles for the respective antenna elements; and performing calculations for dynamically controlling the directivity by utilizing the recorded signals.

2. An adaptive array antenna system comprising:

a plurality of antenna elements each of which has a phase-amplitude change module for modifying a received signal, a combiner for summing up output signals from the phase-amplitude change modules responding to received signals and supplying a resulting sum signal to a demodulator, and a phase-shift amplitude control module for determining a signal-accepting sequence of the phase-amplitude change modules wherein only one of the phase-amplitude change modules in each preamble cycle of a received signal is programmed to accept a signal, and all of the phase-amplitude change modules, one-by-one in the sequence, each using a different preamble cycle of a received signal, are programmed to accept signals, each phase-amplitude change module using a different preamble cycle of a received signal, said phase-shift amplitude control module being configured to accept output signals from the combiner and record the accepted output signals in input storage modules provided for the antenna elements, respectively, wherein the signals received by all the antenna elements are recorded by utilizing different preamble cycles for the respective antenna elements, thereby controlling directivity of the antenna system by making use of the recorded signals.

3. An adaptive array antenna system comprising:

a plurality of antenna elements;

a plurality of phase-amplitude change modules, each being mounted in one of the antenna elements respectively and configured to modify phase and amplitude of a signal received by the antenna element;

a combiner module configured to sum up output signals from the phase-amplitude change modules;

a frequency conversion module provided downstream of the combiner module and configured to convert frequencies of an output signal from the combiner module;

an analog-to-digital module provided downstream of the frequency conversion module and configured to convert an output signal from the frequency conversion module into a digital signal;

a phase shift-amplitude control module provided downstream of the analog-to-digital module and comprising a phase shift-amplitude calculation module configured to calculate values of the phase-amplitude change modules for dynamically controlling directivity of the antenna system, and input storage modules provided for the antenna elements, respectively; and a phase-amplitude determination module provided downstream of the phase shift-amplitude calculation module and connected to the phase-amplitude change module, said phase-amplitude determination module configured to determine values of the phase-amplitude change module, based on results of the calculations performed by the phase shift-amplitude calculation module;

wherein said phase shift-amplitude calculation module is further configured to a) determine a signal-accepting sequence of the phase-amplitude change modules wherein only one of the phase-amplitude change modules in each preamble cycle of a received signal is programmed to accent a signal, and all of the phase-amplitude change modules, one-by-one in the sequence, each using a different preamble cycle of a received signal, are programmed to accept signals, each phase-amplitude change module using a different preamble cycle of a received signal, b) accept output signals from the phase-amplitude change modules as the output signals are outputted in the sequence from the phase-amplitude change modules and record in the input storage modules provided for the antenna elements, respectively, the accepted output signals received by all the antenna elements by making use of different preamble cycles, and c) calculate values of the phase-amplitude change modules for dynamically controlling directivity of the antenna system by utilizing the recorded signals.

4. The adaptive array antenna system according to claim 3, wherein no frequency conversion module and no analog-to-digital module other than those provided downstream of the combiner module are connected to each antenna element.

5. The adaptive array antenna system according to claim 3, further comprising an update stopping module for stopping updates of amount of phase shift and amplitude, connected to the phase shift-amplitude control module.

6. The adaptive array antenna system according to claim 3, wherein the signal accepted by the phase-amplitude change module in a) are comprised of signals obtained at multiple sampling points.

* * * * *